Figure 1:
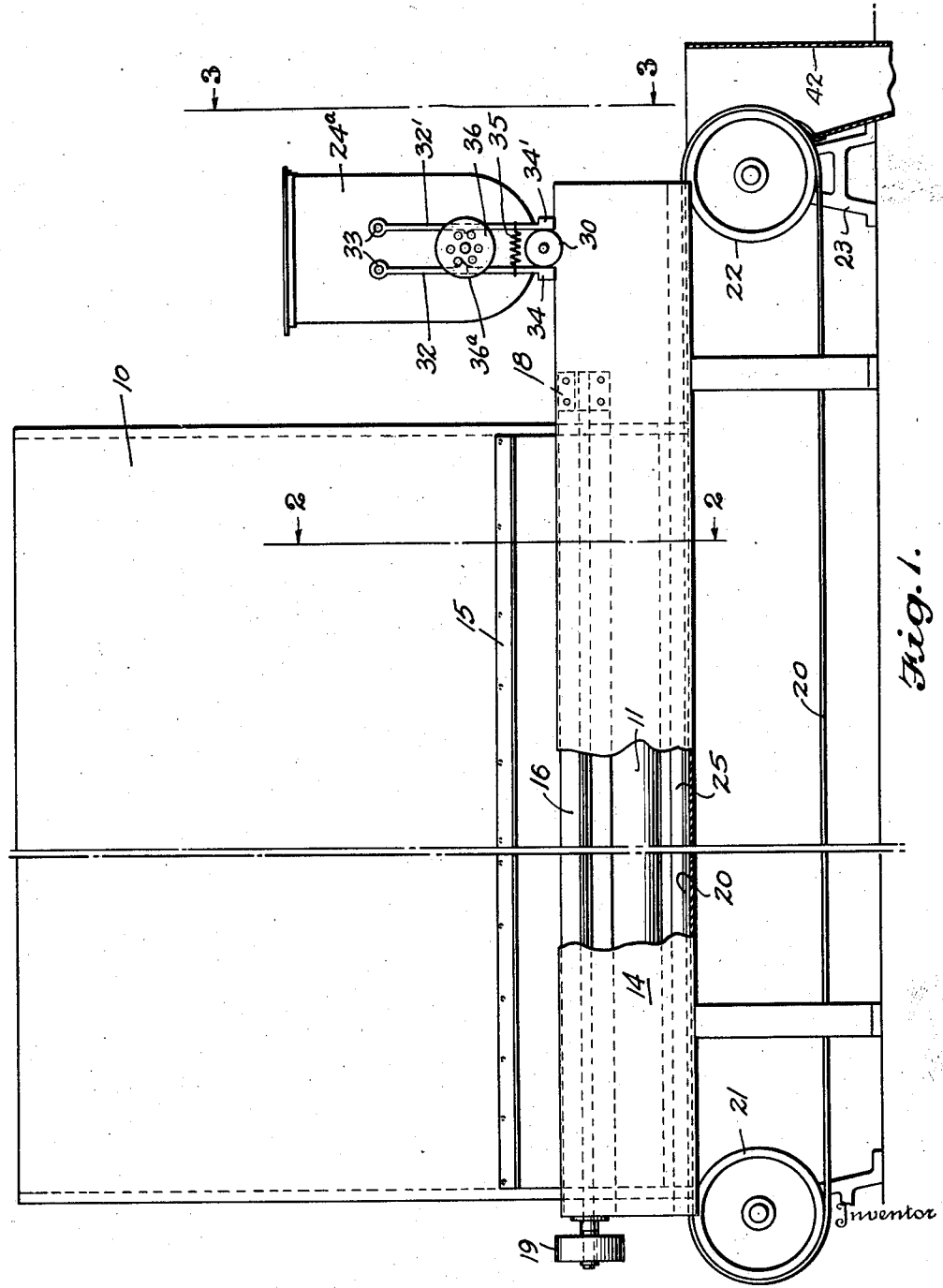

Feb. 25, 1947. L. VAUGHAN 2,416,553
DISPENSER WITH MEANS FOR VIBRATING A CONVEYOR TYPE TRAP CHAMBER
Filed May 23, 1942 2 Sheets-Sheet 1

Inventor
LUCIOUS VAUGHAN,

Feb. 25, 1947.  L. VAUGHAN  2,416,553
DISPENSER WITH MEANS FOR VIBRATING A CONVEYOR TYPE TRAP CHAMBER
Filed May 23, 1942  2 Sheets-Sheet 2
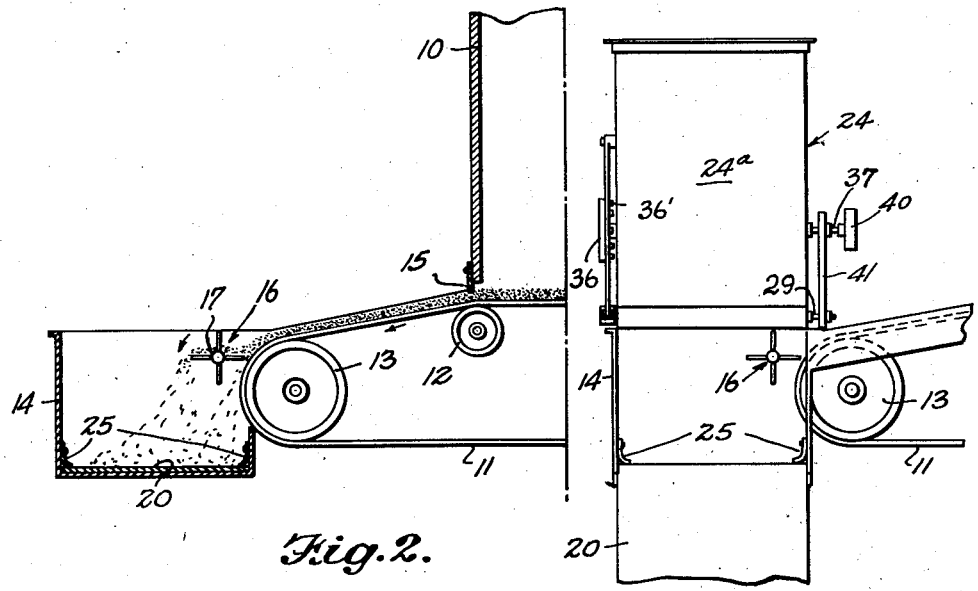
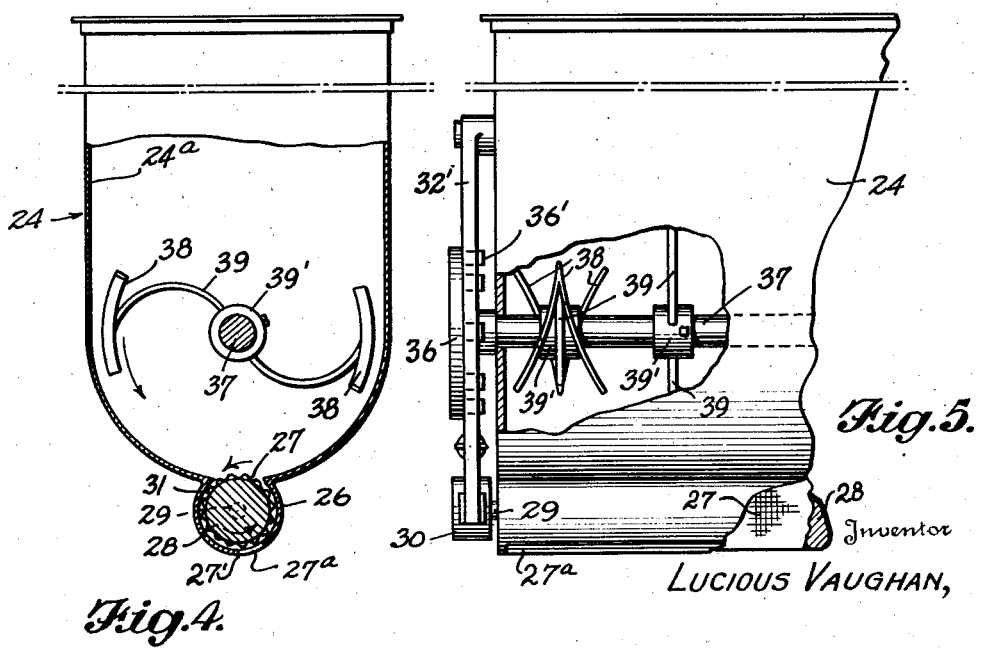
Lucious Vaughan,
Inventor Patented Feb. 25, 1947

2,416,553

UNITED STATES PATENT OFFICE 2,416,553

DISPENSER, WITH MEANS FOR VIBRATING A CONVEYOR TYPE TRAP CHAMBER

Lucious Vaughan, Highland Springs, Va., assignor to Larus & Brother Company, Inc., Richmond, Va., a corporation of Virginia Application May 23, 1942, Serial No. 444,250

3 Claims. (Cl. 222—197)

This invention relates primarily to the processing of tobacco, particularly apparatus for effecting an even and constant admixture of powdered or comminuted flavoring material with tobacco prior to incorporating the latter into the final commercial product.

The invention is not concerned solely with the application of flavoring material to tobacco but contemplates a wider aspect, namely, the provision of a device, apparatus or structure usable not only for the application of powdered flavoring to tobacco but also other uses to which the same may be applied in the tobacco or any other related or unrelated industry.

It is common practice to mix powdered or comminuted flavoring material with tobacco to improve its chewing or smoking qualities, and it is important that the flavoring material be uniformly commingled or mixed with the tobacco prior to incorporating the same into the final product, else there will be too much flavoring in part of a particular brand or grade and too little in other parts, resulting in non-uniform grade or quality. This in turn will result in dissatisfaction among the trade since it may deleteriously affect the taste of a high quality grade or brand of chewing or smoking tobacco irrespective of the quality of the tobacco leaf from which the product was made.

The flavoring material is usually in a highly comminuted or powdered condition, and machines which might be satisfactory for feeding powdered material in the processing of other products have not proven satisfactory in performing a like function in the processing of tobacco.

An object of the present invention therefore is to provide apparatus which will insure a uniform and constant admixture of powdered or comminuted flavoring material with tobacco.

Another and more specific object of the invention is to provide for feeding powdered material at a constant rate irrespective of the degree of comminution of the material or irregularities in the degree of compactness of the material.

A further object is to provide apparatus for feeding powdered material from a hopper or like container having improved means for preventing the material compacting adjacent the walls of the hopper and other areas or spots within the hopper, and in combination therewith, means for ensuring a uniform and smooth feed of the material from the hopper irrespective of any possible lumping of the material.

The foregoing and other objects and advantages of the invention will become apparent in view of the following description taken in conjunction with the drawings, wherein:

Figure 1 is a view in front elevation of apparatus in accordance with the invention;

Fig. 2, a section taken substantially on the line 2—2 of Fig. 1;

Fig. 3, an end elevation of a portion of the apparatus taken substantially on the line 3—3 of Fig. 1;

Fig. 4, a transverse vertical view partly in section of the feed hopper shown at the right-hand side of Fig. 1; and, Fig. 5, a fragmentary view in side elevation of said hopper, partly broken away to better show the construction of the agitator blades.

Referring to the drawings in detail, a tobacco conditioning and drying unit is generally indicated at 10, said unit operating to condition tobacco carried on a conveyor belt or web 11 trained over sheaves 12 and 13, said conveyor being driven in the direction of the arrow in Fig. 2 to convey tobacco to an elongated trough 14 mounted along the front of the unit.

The front wall of the unit 10 has secured to the lower edge thereof a flexible closure or sealing member 15 which depends below said edge and restricts the space between the latter and the conveyor belt 11.

As the tobacco is conveyed to the trough 14 by means of the conveyor webbing or belt 11, it is desirable that the same be loosened and equally or uniformly distributed or deposited in said trough. To insure this action, a reel 16 is mounted on a shaft 17 extending transversely of the conveyor adjacent the point where the latter passes over the roller 13, said shaft at its opposite ends being mounted in bearings 18. A drive pulley 19 is secured on the outer end of shaft 17, the drive on the reel 16 preferably being in a counter-clockwise direction, or in the same direction as the sheave wheel 13 which supports the front end of the conveyor belt 11 as shown by arrows in Fig. 2. This results in the blades engaging the tobacco and fluffing or loosening it and at the same time throwing the tobacco outwardly and distributing it in the trough 14, thereby conditioning the tobacco for receiving the powdered flavoring material.

A conveyor 20 is trained over pulleys 21 and 22 supported by pedestal bearing brackets 23 disposed on the floor of the room in which the apparatus is located, the upper stretch of said conveyor running along the bottom of the trough 14 and taking the tobacco as it is deposited in said trough and conveying it along beneath a flavor-dispensing machine, generally indicated at 24. Elongated flexible sealing strips 25 are provided for preventing tobacco particles from passing over opposite edges of the upper run of the conveyor 20 and thence between the latter and the bottom wall of the trough 14, said strips being secured to the side walls of the trough and overlapping the adjacent edges of the conveyor, note Fig. 2.

The machine 24 comprises a hopper 24a which is adapted to receive powdered or comminuted flavoring material, said hopper having its bottom wall formed with a rounded or substantially cylindrical portion defining a feed roll housing 26 provided with an elongated inlet 27 and an elongated discharge or dispensing slot 27a. Within the housing 26 is mounted a feed roll 28, said roll being carried by a shaft 29 which projects outwardly beyond the front end of the housing 26 and has mounted thereon a tapping disc 30 for a purpose which will be presently described.

The feed roll 28 rotates in the housing 26 and thus has successive peripheral portions thereof exposed to the inlet opening 27 in the bottom of the hopper 24a; and said roll has removably and replaceably secured thereon a powder-receiving and carrying surface preferably in the form of a screen or netting 31, which may be made of wire or other suitable material, and is adapted to engage the powdered flavoring material and carry it around in even quantities to the discharge outlet or slot 27a. The feed roll 28 extends through the opening 27 and projects slightly into the lower portion of the hopper 24a.

It is preferred to locate the slot 27a off-center with respect to the vertical plane containing the longitudinal axis of the feed roll housing 26 and the feed roll 28 mounted therein. Thus it will be noted from Fig. 4 that the leading edge 27' of the slot 27a is substantially in vertical alignment with the axial center of said housing, the terms "leading" and "trailing" being applied in a relative sense in connection with the direction of rotation of the feed roll which in Fig. 4 is illustrated as rotating in a counter-clockwise direction. An advantage of this arrangement is that the powdered material carried around on the surface of the feed roll 28 will begin to be released therefrom as the surface of the roll moves through the lower left-hand angle of rotation and which covers an area of approximately 90°. Thus by the time the roll surface reaches the leading edge 27' of the slot 27a, substantially all of the powdered material will be deposited on the adjacent wall of the housing 26 and will pass over said edge in an even or constant stream, the residue of the material adhering to the surface of the roll 28 being released or discharged as it rotates through the area exposed by the slot 27a.

To insure release of the powdered flavoring material from the periphery of the feed roll, means are provided for transmitting a series of taps or jars to the roll at periodic intervals, such means being in the form of levers or arms 32 and 32' pivotally mounted at 33 on the front wall of the hopper 24a, note particularly Fig. 1, said arms having weighted hammer-ends 34 and 34' which are continually urged inwardly toward the tapping disc 30 by means of a spring 35.

To move the arms outwardly against the resistance of the spring 35, a cam disc 36 is secured on the outer projecting end of agitator shaft 37, said disc having secured thereto a plurality of inwardly projecting pins or cam members 36' adapted to engage cams 36a carried by the arms 32, 32'. These pins 36' are preferably spaced at equal distances around the disc 36 so that they contact the cams 36a at periodic intervals and move the arms outwardly against the resistance of spring 35; and when the cams are released from successive contact with these pins, the arms are pulled inwardly and the hammer ends thereof strike the disc 30 and impart a series of successive blows or vibrations thereto, these blows being transmitted to the shaft 29 and thence to the roll 28. It will be noted that the cams 36a terminate abruptly at their rearward ends so that the releasing action is sudden, producing a hammer-like action of the arms 32, 32'.

Experience has shown that the shaft 29 may be given the usual rigid mounting in its bearings, or in other words it is not necessary to give a floating mounting to said shaft and/or the roll 28 carried thereby, the taps or jars transmitted to the shaft and roll being primarily of a vibratory nature.

To prevent the powdered flavoring material from compacting and "lumping" within the hopper 24a and adjacent the periphery of the roll 28, a series of agitator blades 38 are provided and are mounted on arms 39 projecting radially from collars 39' adjustably secured on the shaft 37. These agitator blades 38 are of a particular construction, each being of a substantially V-shaped contour with the point of the V constituting the leading edge of the blade. The blades are arranged in sets with the blades of the respective sets staggered so that they work over substantially the entire length of the active area of the hopper. As the blades rotate and plow through the material, they not only spread the material laterally of the blades but also lift the material and loosen the latter in the area adjacent the walls. By utilizing agitator blades of this type, it has been found that a more efficient loosening of the powdered flavor material results, eliminating compacted areas within the hopper and particularly adjacent the location where the powdered material feeds into the housing 26. It will be noted that the arms 39 are curved toward the direction of rotation of the agitator blades, to thereby more effectively assist in the "plowing" action of the blades.

The drive on the shaft 37 is illustrated as by means of a pulley 40 secured on the outer end of said shaft and from shaft 37 to shaft 29 by means of belt 41. Thus the agitator shaft 37 is driven in synchronism with the feed roll 28.

From the foregoing, the operation of the apparatus will be readily understood. Tobacco deposited on the belt or webbing 11 is conveyed beneath the conditioning and drying unit 10 and thence to the trough 14, the blades of the reel 16 taking the tobacco from the belt and throwing it upwardly and then outwardly and downwardly to loosen the tobacco and also to more evenly distribute the same on the conveyor 20. The conveyor 20 carries the tobacco along the trough 14 and beneath the outlet or discharge slot 27a of the roll housing 26, at which point an even stream of powdered flavoring material is deposited onto the tobacco and infiltrates thereinto. By means of the improved feed apparatus, the material is fed in an even, smooth flow and, in fact, gives the appearance of a sheet of liquid or fluid being fed from the slot 27a. The drive on the shaft 37 is preferably in direct relation to the drive on the shaft 29 carrying the feed roll 28 and the hammer disc 30; and as the feed roll 28 rotates, the hammer ends 34 and 34' impart a succession of regular intermittent blows to the disc which are transmitted to the roll 28 through the shaft 29. This insures loosening of the material from the periphery of the disc 28 as the latter rotates in the roll housing 26. The wire mesh surface provided on the roll 28 engages the powdered flavoring material and positively transfers a constant film or layer therefrom from the adjacent bottom area of the hopper 24a, the material being carried around to the discharge slot 27a. Due to the constant series of blows or vibrations imparted to the roll 28, the powdered flavoring material will be loosened from the interstices of the feed roll surface, so that when the latter begins to turn in a downward direction, the said material will drop from said surface against the adjacent wall of the roll housing 26. The spacing between the said housing and the surface of the roll is preferably of a restricted nature, or relatively close, so that the material dropping from the surface of the roll against the adjacent wall of the housing will be propelled or conveyed towards the slot 27a and at the same time smoothed and distributed by the roll surface. Thus by the time it reaches the leading edge of the slot 27a, it is free of all lumps and is discharged from the slot in an even sheet throughout the length of the slot. The result is a highly efficient commingling of the flavoring material with the tobacco. After the tobacco on the conveyor 20 has received the flavoring material, it may be discharged by said conveyor into a suitable chute such as indicated at 42, which in turn may lead to conditioning and packaging machines or may deposit the tobacco in a bin for further processing operations.

It will be understood that certain changes in construction and design of the apparatus as well as rearrangement of parts may be adopted without departing from the spirit or scope of the invention as defined by the appended claims.

What is claimed is:

1. Apparatus for feeding powdered material, comprising a hopper adapted to contain the powdered material, a relatively small feed roll housing at the base of the hopper and having an elongated restricted opening forming communication between the hopper and the housing, a feed roll snugly and rotatably mounted in said housing providing a relatively small clearance between said roll and said housing, means providing a surface on said feed roll having a multiplicity of relatively small powder receiving interstices, the upper portion of said feed roll being disposed to extend into the lower portion of the hopper, said housing having an elongated discharge slot in its base through which powder is adapted to fall from said interstices, a shaft extending through said hopper for supporting agitating means, a disc on said shaft, pins carried by said disc, pivotally supported hammers for imparting a series of blows to said feed roll, and resilient means urging said hammers toward said feed roll, said hammers being mounted in a position to be engaged one at a time by said pins for operating said hammers.

2. Apparatus for feeding powdered material comprising a hopper for containing the powdered material, a feed roll housing of relatively small diameter at the base of the hopper and having an elongated restricted opening forming communication between the hopper and the housing, a feed roll rotatably mounted in said housing and of a size to provide a relatively small clearance between said roll and said housing, wire screening providing a surface on said feed roll having a multiplicity of relatively small powder receiving interstices, the upper portion of said feed roll being disposed to extend into the lower portion of the hopper, said housing having an elongated offset discharge slot in its base through which powder is adapted to fall from said interstices, a shaft extending through said hopper for supporting agitating means, a member on said shaft, spaced pins carried by said member, pivotally supported hammers for imparting a series of blows to said feed roll, and resilient means urging said hammers toward said feed roll, said hammers being mounted in a position to be engaged one at a time by said pins for operating said hammers.

3. Apparatus for feeding powdered material comprising a hopper adapted to contain powdered material, a relatively small feed roll housing at the base of the hopper and having an elongated restricted opening forming communication between the hopper and the housing, a feed roll rotatably mounted in said housing and providing a relatively small clearance between said roll and said housing, means providing a surface on said feed roll having a multiplicity of relatively small powder receiving interstices, the upper portion of said feed roll being disposed to extend slightly into the lower portion of the hopper, said housing having an elongated discharge slot in its base through which powder is adapted to fall from said interstices, a shaft extending through said hopper, agitating means carried by said shaft, percussive means for imparting a series of blows to said feed roll, and cam means carried by said shaft for actuating said percussive means.

LUCIOUS VAUGHAN.

REFERENCES CITED

The following references are of record in the file of this patent:

UNITED STATES PATENTS

| Number | Name | Date |
|---|---|---|
| 2,166,022 | Repper | July 11, 1939 |
| 1,984,980 | Muller | Dec. 18, 1934 |
| 1,201,136 | Barwell | Oct. 19, 1916 |
| 2,248,700 | Finnel | July 8, 1941 |
| 277,319 | Miller | May 8, 1883 |
| 443,654 | Powers | Dec. 30, 1890 |
| 1,222,584 | Barr | Apr. 10, 1917 |
| 97,137 | Van Brunt | Nov. 23, 1869 |
| 2,061,955 | Waddick | Nov. 24, 1936 |
| 2,205,324 | Venable | June 18, 1940 |
| 2,211,435 | Peterson | Aug. 13, 1940 |
| 85,379 | Going | Dec. 29, 1868 |
| 420,385 | Horan | Jan. 28, 1890 |
| 468,868 | Fickett | Feb. 16, 1892 |
| 1,724,113 | Small | Aug. 13, 1929 |

FOREIGN PATENTS

| Number | Country | Date |
|---|---|---|
| 8,096 | British | May 23, 1890 |
| 473,815 | French | Jan. 27, 1915 |